(12) United States Patent
Zhang et al.

(10) Patent No.: US 11,729,290 B1
(45) Date of Patent: Aug. 15, 2023

(54) INTELLIGENT MULTICAST PROXY BETWEEN CONTAINER AND OUTSIDE NETWORK

(71) Applicant: Lenovo Global Technology (United States) Inc., Morrisville, NC (US)

(72) Inventors: Caihong Zhang, Shanghai (CN); Fred Allison Bower, III, Durham, NC (US); Jiang Chen, Shanghai (CN); Zhichen Wang, Shanghai (CN)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 18/088,936

(22) Filed: Dec. 27, 2022

(51) Int. Cl.
*H04L 67/56* (2022.01)
*H04L 41/12* (2022.01)
*H04L 67/51* (2022.01)

(52) U.S. Cl.
CPC .............. *H04L 67/56* (2022.05); *H04L 41/12* (2013.01); *H04L 67/51* (2022.05)

(58) Field of Classification Search
None
See application file for complete search history.

(56) References Cited

FOREIGN PATENT DOCUMENTS

WO WO-2022187796 A1 * 9/2022 ............. H04L 45/04

* cited by examiner

*Primary Examiner* — Tonia L Dollinger
*Assistant Examiner* — Ishrat Rashid
(74) *Attorney, Agent, or Firm* — Kunzler Bean & Adamson; Bruce R. Needham (57) ABSTRACT

A method for an intelligent multicast proxy between containers and an outside network includes receiving, at a proxy, a multicast discovery message from a container of one or more containers running on a host OS of a server. The proxy is running on the host OS and the server is connected to computing devices over a subnet network. The method includes adding a container tag to a user defined field of the multicast discovery message and relaying the multicast discovery message with the container tag to two or more of the computing devices connected to the subnet network. The method includes receiving a response to the multicast discovery message, where the response includes the container tag, and relaying the response to the container based on the container tag.

20 Claims, 6 Drawing Sheets

INTELLIGENT MULTICAST PROXY BETWEEN CONTAINER AND OUTSIDE NETWORK

FIELD

The subject matter disclosed herein relates to containers on a server and more particularly relates to deploying a multicast proxy between containers and an outside network.

BACKGROUND

Some applications running in a container of a host operating system ("OS") have a need to send out and receive multicast packets for specific protocols, such as Simple Service Discovery Protocol ("SSDP") and Service Location Protocol ("SLP"), to discover computing devices or services on a same subnet network. When the applications are containerized and deployed on a container software platform, such as Docker® or Kubernetes®, using a default bridge network, the containers typically only have a private address. Therefore, the multicast packets cannot communicate in and out from the containers to a network external to a server running the host OS.

BRIEF SUMMARY

A method for an intelligent multicast proxy between containers and an as outside network is disclosed. An apparatus and computer program product also perform the functions of the method. The method includes receiving, at a proxy, a multicast discovery message from a container of one or more containers running on a host OS of a server. The proxy is running on the host OS and the server is connected to computing devices over a subnet network. The method includes adding a container tag to a user defined field of the multicast discovery message and relaying the multicast discovery message with the container tag to two or more of the computing devices connected to the subnet network. The method includes receiving a response to the multicast discovery message, where the response includes the container tag, and relaying the response to the container based on the container tag.

An apparatus for an intelligent multicast proxy between containers and an outside network includes one or more processors and non-transitory computer readable storage media storing code. The code is executable by the one or more processors to perform operations that include receiving, at a proxy, a multicast discovery message from a container of one or more containers running on a host OS of a server. The proxy is running on the host OS and the server is connected to computing devices over a subnet network. The operations include adding a container tag to a user defined field of the multicast discovery message and relaying the multicast discovery message with the container tag to two or more of the computing devices connected to the subnet network. The operations include receiving a response to the multicast discovery message, where the response includes the container tag, and relaying the response to the container based on the container tag.

A program product for an intelligent multicast proxy between containers and an outside network includes a non-transitory computer readable storage medium storing code. The code is configured to be executable by a processor to perform operations that include receiving, at a proxy, a multicast discovery message from a container of one or more containers running on a host OS of a server. The proxy is running on the host OS and the server is connected to computing devices over a subnet network. The operations include adding a container tag to a user defined field of the multicast discovery message and relaying the multicast discovery message with the container tag to two or more of the computing devices connected to the subnet network. In some embodiments, receiving a response to the multicast discovery message, where the response includes the container tag, and relaying the response to the container based on the container tag.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium, which is defined herein as non-transitory. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python®, Ruby, R™, Java™, JavaScript®, Smalltalk, C++, C sharp, Lisp, Clojure®, PHP™, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for an intelligent multicast proxy between containers and an outside network is disclosed. An apparatus and computer program product also perform the functions of the method. The method includes receiving, at a proxy, a multicast discovery message from a container of one or more containers running on a host OS of a server. The proxy is running on the host OS and the server is connected to computing devices over a subnet network. The method includes adding a container tag to a user defined field of the multicast discovery message and relaying the multicast discovery message with the container tag to two or more of the computing devices connected to the subnet network. The method includes receiving a response to the multicast discovery message, where the response includes the container tag, and relaying the response to the container based on the container tag.

In some embodiments, the method includes deploying the proxy on the host OS. The proxy is connected to the one or more containers. In other embodiments, deploying the proxy includes deploying a socket in the proxy. The one or more containers mount the socket for communications with each other and for communicating the multicast discovery message. In other embodiments, the socket is a UNIX® Domain Socket. In other embodiments, each of the one or more containers mount a socket file associated with the socket. A container of the one or more containers mounting the socket file enables communication between the container and the proxy.

In some embodiments, the proxy relaying the multicast discovery message includes relaying the multicast discovery message to a plurality of the computing devices connected to the subnet network. In other embodiments, the one or more containers execute within a container software platform running on the host OS. In other embodiments, protocol of the multicast discovery message is SSDP or SLP. In other embodiments, the method includes creating a container map that includes, for each of the one or more containers, a correlation between an identifier of the container and a container tag. In other embodiments, the one or more containers include two or more containers and the method includes relaying, at the proxy, a message from a first container of the two or more containers to a second container of the two or more containers. The message includes an identifier of second container. In other embodiments, the proxy includes an internet protocol ("IP") address of the subnet network and the proxy enables network access to the computing devices connected to the subnet network.

An apparatus for an intelligent multicast proxy between containers and an outside network includes one or more processors and non-transitory computer readable storage media storing code. The code is executable by the one or more processors to perform operations that include receiving, at a proxy, a multicast discovery message from a container of one or more containers running on a host OS of a server. The proxy is running on the host OS and the server is connected to computing devices over a subnet network. The operations include adding a container tag to a user defined field of the multicast discovery message and relaying the multicast discovery message with the container tag to two or more of the computing devices connected to the subnet network. The operations include receiving a response to the multicast discovery message, where the response includes the container tag, and relaying the response to the container based on the container tag.

In some embodiments, the operations include deploying the proxy on the host OS, the proxy connected to the one or more containers. In other embodiments, deploying the proxy includes deploying a socket in the proxy. The one or more containers mount the socket for communications with each other and for communicating the multicast discovery message. In other embodiments, each of the one or more containers mount a socket file associated with the socket. A container of the one or more containers mounting the socket file enables communication between the container and the proxy. In other embodiments, the proxy relaying the multicast discovery message includes relaying the multicast discovery message to a plurality of the computing devices connected to the subnet network. In other embodiments, the one or more containers execute within a container software platform running on the host OS. In other embodiments, the operations include creating a container map that includes, for each of the one or more containers, a correlation between an identifier of the container and a container tag.

A program product for an intelligent multicast proxy between containers and an outside network includes a non-transitory computer readable storage medium storing code. The code is configured to be executable by a processor to perform operations that include receiving, at a proxy, a multicast discovery message from a container of one or more containers running on a host OS of a server. The proxy is running on the host OS and the server is connected to computing devices over a subnet network. The operations include adding a container tag to a user defined field of the multicast discovery message and relaying the multicast discovery message with the container tag to two or more of the computing devices connected to the subnet network. In some embodiments, receiving a response to the multicast discovery message, where the response includes the container tag, and relaying the response to the container based on the container tag.

In some embodiments, the operations include deploying the proxy on the host OS. The proxy is connected to the one or more containers and deploying the proxy includes deploying a socket in the proxy. The one or more containers mount the socket for communications with each other and for communicating the multicast discovery message.

Figure 1:
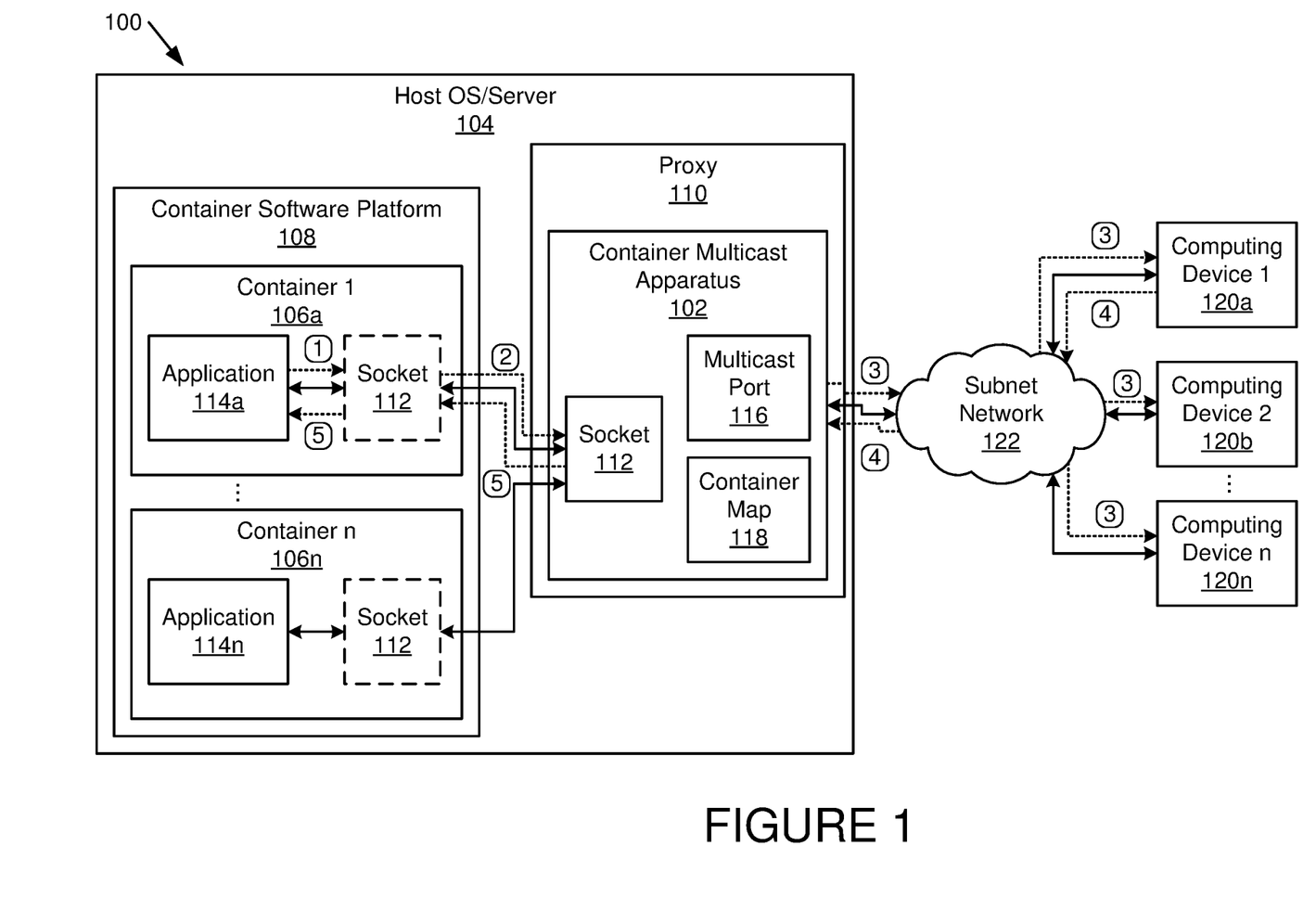
FIG. 1 is a schematic block diagram illustrating a system for an intelligent multicast proxy between containers and an outside network, according to various embodiments.

FIG. 1 is a schematic block diagram illustrating a system 100 for an intelligent multicast proxy 110 between containers 106 and an outside network, according to various embodiments. The system 100 includes a container multicast apparatus 102 operating in a host operating system ("OS") 104 of a server 104. The host OS 104 includes containers 1-n 106a-106n (generically or collectively "106") executing on a container software platform 108. The host OS 104 also includes a proxy 110 with a socket 112 and the containers 106 each execute an application 114 (e.g., 114a-114n). The proxy 110 includes a multicast port 116 and a container map 118. The host OS/server 104 is connected to computing devices 120a-120n (generically or collectively "120") over a subnet network 122.

The container multicast apparatus 102 is depicted in the host OS 104 and within the proxy 110, but some or all of the container multicast apparatus 102 may be included in the proxy 110, containers 106 and/or container software platform 108. The container multicast apparatus 102 provides a mechanism for containers 106, which have a private address, which may be in the form of a file name or other non-IP address format, to send multicast discovery messages to computing devices 120 on the subnet network 122 to discover the computing devices 120. The container multicast apparatus 102 deploys a proxy 110 with a multicast port 116 and a socket 112 connected to the containers 106.

When a container 106 (e.g., container 1 106a) sends a multicast discovery message via the socket 112, the proxy adds a container tag from a container map 118 to a user-defined field of the multicast discovery message that corresponds to the container (e.g., 106a) and relays the multicast discovery message to the computing devices 120. When a computing device 120 (e.g., computing device 1 120a) replies to the multicast discovery message, the computing device (e.g., 120a) includes the container tag in a user-defined field of a response message. The proxy 110 receives the response message, reads the container tag, and forwards the response message to the appropriate container 120 (e.g., first container 106a). The container multicast apparatus 102 is described in more detail with regard to the apparatuses 200, 300 of FIGS. 2 and 3.

The host OS/server 104, in some embodiments, is a server of a datacenter and the computing devices 120 are other servers, storage devices, switches, etc. of the datacenter. In some examples, the server 104 is a rack mounted server in a server pod. In other embodiments, the server 104 is a blade server. In other embodiments, the server 104 is a standalone server, such as a desktop computer, a workstation, etc. One of skill in the art will recognize other embodiments of a server 104 running a host OS 104 capable of running containers 106.

Containers 106, in some embodiments, are executable units of software in which application code is packaged, along with libraries, dependencies, etc. Containers 106 differ from virtual machines. A virtual machine ("VM") is typically virtualized by a hypervisor that runs a separate instance of an operating system and a virtual copy of the hardware that the operating system requires to run. The VM also includes an application, libraries, etc. Containers 106, in some embodiments, virtualize the operating system (e.g., host OS 104) so a container 106 typically includes only the application (e.g., 114) and associated libraries. While containers 106 may be somewhat less secure than virtual machines, containers 106 are often desired because containers 106 are small, fast, and portable compared to virtual machines.

In some embodiments, containers 106 are specifically created to run an application 114. The application 114 of a container 106, in some embodiments, is controlled by a client (not shown). For example, a user may access a computing device that is a client connected to the server 104 through a computer network (not shown) that may include a LAN, a WAN, the Internet, a fiber network, a wireless connection, etc. In some embodiments, the user accesses the application 114 as a cloud-based service where the cloud-based service is implemented in a datacenter with the server 104. Containers 106 are convenient ways for a user to implement access to an application 114 on a leased basis so that the user does not have to host the application 114 locally. Containers 106 provide separation between users in a more lightweight implementation than virtual machines.

The subnet network 122, in some embodiments, is a portion of a computer network. A subnet or subnetwork typically has a portion of an IP address identifying the subnet network 122 and computing devices 120 on the subnet network 122 all have IP addresses with the same portion of the IP address identifying the subnet network 122. In some embodiments, the subnet network 122 is a LAN. In other embodiments, the subnet network 122 includes multiple network types, such wired and wireless, but the network types connect to computing devices 120 with an IP address common to the subnet network 122. In some embodiments, the subnet network 122 is separated from other parts of the computer network with one or more routers. For example, a router may separate the Internet from a LAN that is a subnet. One of skill in the art will recognize other features of a subnet network 122.

The subnet network 122 or external network may include a wireless connection. The wireless connection may be a mobile telephone network. The wireless connection may also employ a Wi-Fi® network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT-F® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Containers 106, in various embodiments, are deployed and run on various container software platforms 108, such as Docker®, Containerd®, and Container Runtime Interface ("CRI")-O ("CRI-O™") where the "O" is for open source. In some embodiments, Docker, Containerd, CRI-O, etc. are used by Kubernetes®, which is an open-source orchestration system for automating software deployment, scaling, management, etc.

Typically, container software platforms 108 implementing containers 106 are unable to transmit multicast discovery messages typically because the containers 106 are running on a container internal network, which allows containers 106 to communicate internally, but the containers 106 are unable to communicate multicast discovery messages to the outside subnet network 122 to discover the computing devices 120. A multicast discovery message is part of a discovery protocol that allows a device or container 106 to discover connected computing devices 120. Examples of common discovery services include Simple Service Discovery Protocol ("SSDP") and Service Location Protocol ("SLP"). Other current and future discovery services may also lack an ability to transmit multicast discovery messages and may also be used in conjunction with the container multicast apparatus 102. While containers 106 and container software platforms 108 support unicast messages, multicast discovery messages are not available. Typically, containers 106 communicate using a private address that is private within the container software platform 108 and/or host OS 104. In some embodiments, the private address is an IP address. In other embodiments, the private address is another format and may be a file name, location, or other address different from an IP address. In other embodiments, the private address is an IP address uses within the host OS 104 or container software platform 108 and is not known to the subnet network 122 or computing devices 120.

Some solutions to enable containers 106 to discover connected computing devices 120 require each container 106 to set up a standalone virtual network interface. However, such an embodiment requires an IP address for each container 106. Other options include a host network mode. However, the host network mode option is a security concern because each container 106 is required to have certain privileges to the host network interface card ("NIC"). The container multicast apparatus 102 implementing a proxy 110 provides a unique solution with a single IP address for some or all of the containers 106 of a host OS 104. The container multicast apparatus 102 leverages a user-defined field in a multicast discovery message to enable the proxy 110 and computing devices 120 to communicate over a single IP address of the subnet network 122.

The proxy 110 enables a container 106 to send multicast discovery messages to computing devices 120 of the subnet network 122. In some embodiments, the proxy 110 includes a socket 112 to enable connection between the proxy 110 and the containers 106. In some embodiments, the socket is a UNIX® domain socket ("UDS"). The socket 112, in some embodiments, is accessible to a container 106 after the container mounts a file of the socket 112. In some embodiments, after mounting communication between the container 106 and the proxy 110 is enabled. The socket 112 is depicted in the containers 106 with dashed lines indicating that the container 106 have access to the socket 112 in a similar manner as the containers 106 or other device would have access to a storage device or other hardware that is mounted. In some embodiments, the socket 112 appears as a resource on the containers 106 while executing in the proxy 110. In some embodiments, the socket 112 allows containers 106 to communicate with each other.

In some embodiments, the socket is a UNIX® domain socket ("UDS"). UNIX domain sockets are often used for containers as a means to allow communication with containers 106 via the private addresses of the containers 106. In other embodiments, the socket 112 is a network socket implemented in a way to allow multicast discovery messages from a single multicast port 116 of the server 104. In other embodiments, the socket 112 is implemented using another current or future protocol that allows multicast discovery messages.

The proxy 110, in some embodiments, includes a multicast port 116 with an IP address of the subnet network 122 through which multicast discovery messages and responses related to two or more containers 106 are communicated. The IP address is a subnet address of a network between the host OS/server 104 and other computing devices 120. Typically, the system 100 will also have a gateway (not shown) of some sort, such as a router that enables communication between external devices (such as clients) and the server 104 and/or computing devices 120 of the subnet network 122. The gateway typically includes a firewall for security. Other embodiments include another proxy with firewall functions for external connections, such as with a management network. The subnet network 122 typically provides a benefit of allowing communication between the server 104 and computing devices 120 of the subnet network 122 while maintaining a level of security at the gateway. Note that the computing devices 120 may also be servers with containers 106 and may include a container multicast apparatus 102 implementing a proxy 110.

In some embodiments, the multicast port 116 is a User Datagram Protocol ("UDP") multicast port. The UDP multicast port is configured to relay UDP multicast discovery messages received by the Proxy 110 from a container 106 and to send out multicast discovery messages in a UDP format. The UDP multicast port is also configured to receive responses from the UDP multicast discovery message that include a container tag and to forward the response to the proxy 110 for transmission to the proper container 106.

The proxy 110 includes, in some embodiments, a container map 118 that maps containers 106 with container tags. An example of a container map 118 is depicted in Table 1:

TABLE 1

Container Map 118

| Container ID | Container Tag |
|---|---|
| Container 1 | C0001 |
| Container 2 | C0002 |
| Container 3 | C0003 |
| ... | ... |
| Container n | C000n |

The container ID, in some embodiments, is the private address of the containers 106. In other embodiments, the container ID is another container identifier that uniquely identifies each container. The container tag is an identifier that is able to be included in a user-defined field of a multicast discovery message. The container tag may include numbers, letters, or any other characters appropriate for a multicast discovery message.

An example of operation of the container multicast apparatus 102 is depicted in FIG. 1 with the numbered dashed lines. A first step includes a first application 114a and/or a first container 106a creating a multicast discovery message, which is sent to the proxy 110 in a second step using the socket 112. The proxy 110 determines which container 106 (in this case the first container 106a) sent the multicast discovery message and accesses the appropriate container tag (e.g., C0001) in the container map 118, and adds the container tag to a user-defined field of the multicast discovery message. The proxy 110 transmits (step 3) the multicast discovery message to each computing device 120 of the subnet network 122.

In the depicted example, the first computing device 120a responds to the multicast discovery message and includes the same container tag in the multicast discovery message in a response (step 4) in a user-defined field of the response. The proxy 110 receives the response, reads the user-defined field to discover the container tag and relays the response (step 5) to the appropriate container 106, which in the example is the first container 106a. While the example above is mentioned in terms of the proxy 110 taking action, in some embodiments, the container multicast apparatus 102 acts within the proxy 110 to relay messages, access the container map 118, etc.

Figure 2:
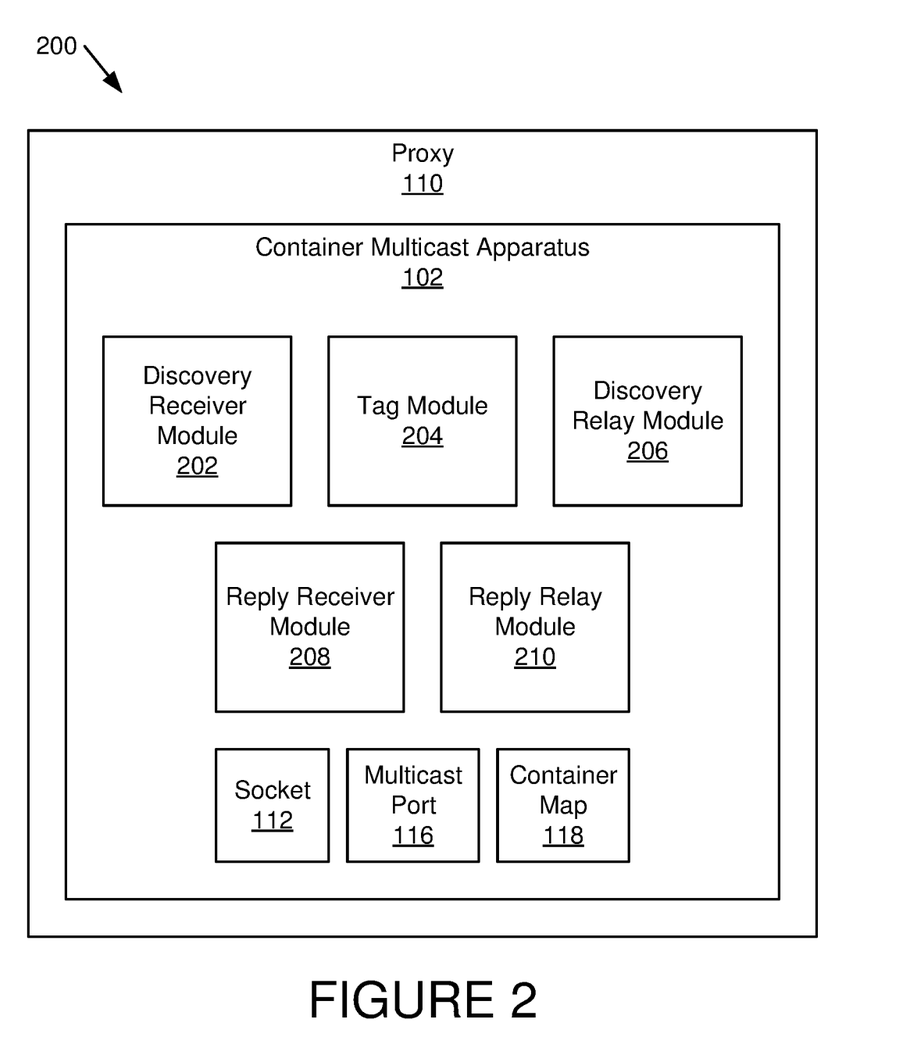
FIG. 2 is a schematic block diagram illustrating an apparatus for an intelligent multicast proxy between containers and an outside network, according to various embodiments.

FIG. 2 is a schematic block diagram illustrating an apparatus 200 for an intelligent multicast proxy 110 between containers 106 and an outside network, according to various embodiments. The apparatus 200 includes a proxy 110 with a container multicast apparatus 102 with a discovery receiver module 202, a tag module 204, a discovery relay module 206, a reply receiver module 208, and a reply relay module 210, which are described below. The container multicast apparatus 102 includes a socket 112, multicast port 116, and a container map 118. In some embodiments, the proxy 110, socket 112, multicast port 116, and container map 118 are substantially similar to those described above in relation to the system 100 of FIG. 1. In various embodiments, all or a portion of the apparatus 200 is implemented as executable code stored on computer readable storage media, which is non-transitory. In other embodiments, all or a portion of the apparatus 200 is implemented with a programmable hardware device and/or hardware circuits.

The apparatus 200 includes a discovery receiver module 202 configured to receive, at a proxy 110, a multicast discovery message from a container (e.g., 106a) of one or more containers 106 running on a host OS of a server 104. In some embodiments, the multicast discovery message is a UDP multicast discovery message. The proxy 110 is running on the host OS 104 and the server 104 is connected to computing devices 120 over a subnet network 122. In some embodiments, the one or more containers 106 are running on a container software platform 108, such as Docker with Kubernetes. The one or more containers 106 each include at least one application 114 which is accessible from a computing device 120, external client, etc.

In some embodiments, the proxy 110 includes a socket 112 and the multicast discovery message is received through the socket 112. In some embodiments, the socket 112 is a UNIX domain socket, a network socket, or other socket capable of receiving multicast messages from a container 106. In some embodiments, the multicast discovery message is intended for all of the computing devices 120 of the subnet network 122. In other embodiments, the multicast discovery message is intended for a subset of the computing devices 120 of the subnet network 122, such as just for servers, just for storage devices, etc. In other embodiments, the discovery receiver module 202 receives the multicast discovery message from the container 106 without a socket 112.

In the embodiments, the multicast discovery message is formatted as a multicast message and includes information necessary to instruct the proxy 110 to transmit the multicast discovery message to selected computing devices 120 (some or all). In some embodiments, the multicast message is of a standard format and includes a user-defined field suitable for inclusion of a container tag, such as a search target field.

The apparatus 200 includes a tag module 204 configured to add a container tag to a user defined field of the multicast discovery message. In some embodiments, the container tag is added to the user-defined field of the multicast discovery message at the proxy 110. The tag module 204 is configured to determine which container (e.g., 106a) sent the multicast discovery message and to select a container tag associated with the container 106a that sent the multicast discovery message. In some embodiments, the tag module 204 accesses a container map 118 to determine which container tag is associated with the container 106a that sent the multicast discovery message. For example, for container 1 106a, the tag module 204 may access the container map 118 and may then retrieve C0001 as the applicable container tag. The container tag may be of any format appropriate for identifying a container 106 and being inserted into a user-defined field of a multicast discovery message. The tag module 204 then inserts the retrieved container tag into a user-defined field of the multicast discovery message.

In some embodiments, the tag module 204 formats the user-defined field with more than just the container tag. An example of pseudocode for a multicast message that embodies a multicast discovery message includes:

M-SEARCH * HTTP/1.1
HOST: 239.255.255.250:1900
MAN: "ssdp:discover"
MX: 5
ST: urn:dmtf-org: service:redfish-rest: 1C0001

M-SEARCH signified a discovery message rather than a NOTIFY message, which is sent when a device wants to advertise itself. The host field includes an IP address of the host OS/server 104. The MAN field is a description of the packet type and in the example above includes an SSDP discovery packet. The MX field is a number of seconds to wait to send a response. The ST field is a "search target" field and is a user-defined field suitable for the container tag of C0001 in addition to other information defining the field. One of skill in the art will recognize other ways for the tag module 204 to format a SSDP multicast discovery message or a multicast discovery message for another discovery protocol.

The apparatus 200 includes a discovery relay module 206 configured to relay the multicast discovery message with the container tag to two or more of the computing devices 120 connected to the subnet network 122. In some embodiments, the discovery relay module 206 relays the multicast discovery message from the multicast port 116 of the proxy 110. In some embodiments, the multicast socket 116 is a UDP multicast port and the discovery relay module 206 relays a UDP multicast discovery message. The multicast port 116, in some embodiments, is a port of a network interface card ("NIC") of the server 104 used for general network communications. In other embodiments, the multicast port 116 is a port of a dedicated NIC or other interface of a dedicated management network and the subnet network 122 is a management network. In such embodiments, the server 104 is typically connected to the computing devices 120 and external devices over a different network, which may also be a subnet network 122.

In some embodiments, the discovery relay module 206 relays the multicast discovery message to each computing device 120 connected to the subnet network 122. In other embodiments, the discovery relay module 206 relays the multicast discovery message to a subset of the computing devices 120 of the subnet network 122. In other embodiments, the multicast discovery message dictates which computing devices 120, type of computing devices 120, etc. receive the multicast discovery message. One of skill in the art will recognize other ways for the discovery relay module 206 to determine which computing devices 120 of the subnet network 122 to send the multicast discovery message.

The apparatus 200 includes a reply receiver module 208 configured to receive a response to the multicast discovery message. The response includes the container tag. In some embodiments, the response is a response to a UDP multicast discovery message. In addition, the response includes information about the computing device 120a, such as a Media Access Control ("MAC") address, a Unique User Identifier ("UUID"), information about functionality of the computing device 120a, and other relevant information about the computing device 120a for discovery purposes.

In some embodiments, a protocol or format of multicast messages transmitted over the subnet network 122 is such that responses to multicast messages include all or a portion of a user-defined field of a multicast message. In some embodiments, the user-defined field is a search tag ("ST") field and the computing devices 120 are programmed to include some or all of what is in a received multicast message in a response. In various embodiments, the protocol of the multicast discovery messages is such that at least the container tag is returned in responses from a computing device 120 of the subnet network 122. In some embodiments, the reply receiver module 208 receives the response to the multicast discovery message at the multicast port 116.

As depicted in FIG. 1, the reply receiver module 208 may receive a response from the first computing device 120a. In other embodiments, the reply receiver module 208 receives a response from some or all of the computing devices 120 of the subnet network 122.

The apparatus 200 includes a reply relay module 210 configured to relay the response to the container 106 based on the container tag. As depicted in the example in FIG. 1, the first container 106a sent the multicast discovery message so the response received by the reply receiver module 208 includes the container tag C0001 of the first container 106a so the reply relay module 210 relays the received response to the first container 106a.

Figure 3:
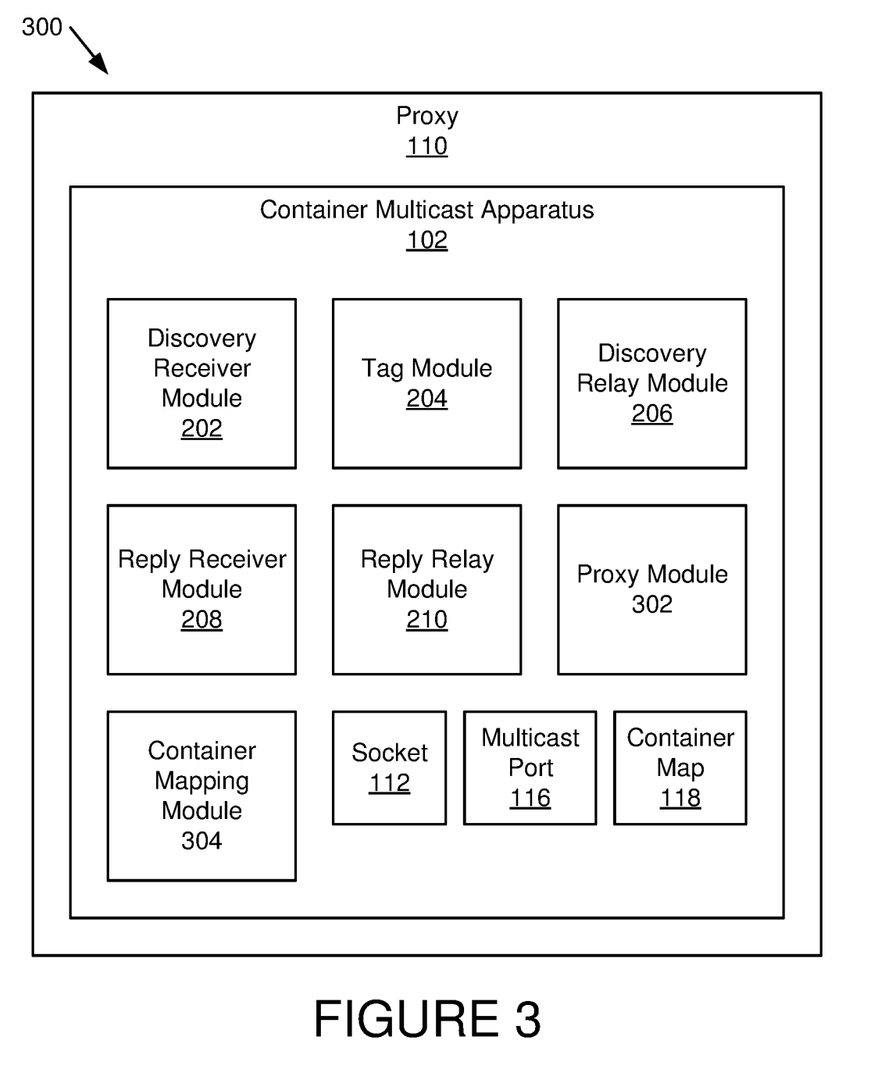
FIG. 3 is a schematic block diagram illustrating another apparatus for an intelligent multicast proxy between containers and an outside network, according to various embodiments.

FIG. 3 is a schematic block diagram illustrating another apparatus 300 for an intelligent multicast proxy 110 between containers 106 and an outside network, according to various embodiments. The apparatus 300 includes a proxy 110 with a container multicast apparatus 300 that includes a discovery receiver module 202, a tag module 204, a discovery relay module 206, a reply receiver module 208, and a reply relay module 210, which are substantially similar to those described above in relation the apparatus 200 of FIG. 2. The apparatus 300, in various embodiments, includes a proxy module 302 and/or a container mapping module 304, which are described below. The container multicast apparatus 102 includes a socket 112, multicast port 116, and a container map 118. In some embodiments, the proxy 110, socket 112, multicast port 116, and container map 118 are substantially similar to those described above in relation to the system 100 of FIG. 1. The apparatus 300 may be implemented similarly to the apparatus 200 of FIG. 2.

The apparatus 300, in some embodiments, includes a proxy module 302 configured to deploy a proxy 110 on the host OS 104. The proxy 110 is connected to the one or more containers 106. In some embodiments, the proxy module 302 is configured to deploy the proxy 110 during a setup operation or time before discovery by the containers 106. In some embodiments, the proxy module 302 deploys a socket 112, for example, when setting up the proxy 110, which may be within the proxy 110. In some embodiments, the socket 112 is a UNIX domain socket. In other embodiments, the socket 112 is a network socket or other type of socket. The socket 112 provides a way for the containers 106 to communicate with the proxy 110 and the computing devices 120 connected to the subnet network 122. After deployment of the socket 112, the containers 106, in some embodiments, mount the socket 112 to enable communication between the proxy 110 and the containers 106.

In some embodiments, the proxy module 302 sets up a multicast port 116 in the proxy 110. In some embodiments, the proxy 110 communicates to the subnet network 122 through the multicast port 116. In some embodiments, the proxy module 302 obtains an IP address for the multicast port 116. The multicast port 116, in some embodiments, serves as a single point of contact for computing devices 120 communicating with containers 106. In some embodiments, the proxy 110 services multicast discovery messages from the containers 106. In other embodiments, the proxy 110 relays other messages to and from the containers 106.

The apparatus 300 includes, in some embodiments, a container mapping module 304 configured to create a container map 118 that includes, for each of the one or more containers 106 executing on the host OS 104, a correlation between an identifier of the container 106 and a container tag. In some embodiments, the container mapping module 304 creates the container map 118 as directed by a user. In other embodiments, the container mapping module 304 creates the container map 118 as each container 106 is created and may work in conjunction with the container software platform 108.

In various embodiments, the container mapping module 304 creates the container map 118 using a table, a database, or any other appropriate data structure. In some embodiments, the container mapping module 304 stores the container map 118 on the server 104 available to the proxy 110. In other embodiments, the container mapping module 304 stores the container map 118 on a data storage device external to the server 104. In some embodiments, the container mapping module 304 creates the container map 118 with an address of a container correlated with a container tag for each container 106. In other embodiments, the container mapping module 304 uses another identifier of each container 106 to correlate with a container tag. In other embodiments, the container mapping module 304 includes other information about each container 106 in the container map 118. One of skill in the art will recognize other ways for the container mapping module 304 to create and format a container map 118.

Figure 4:
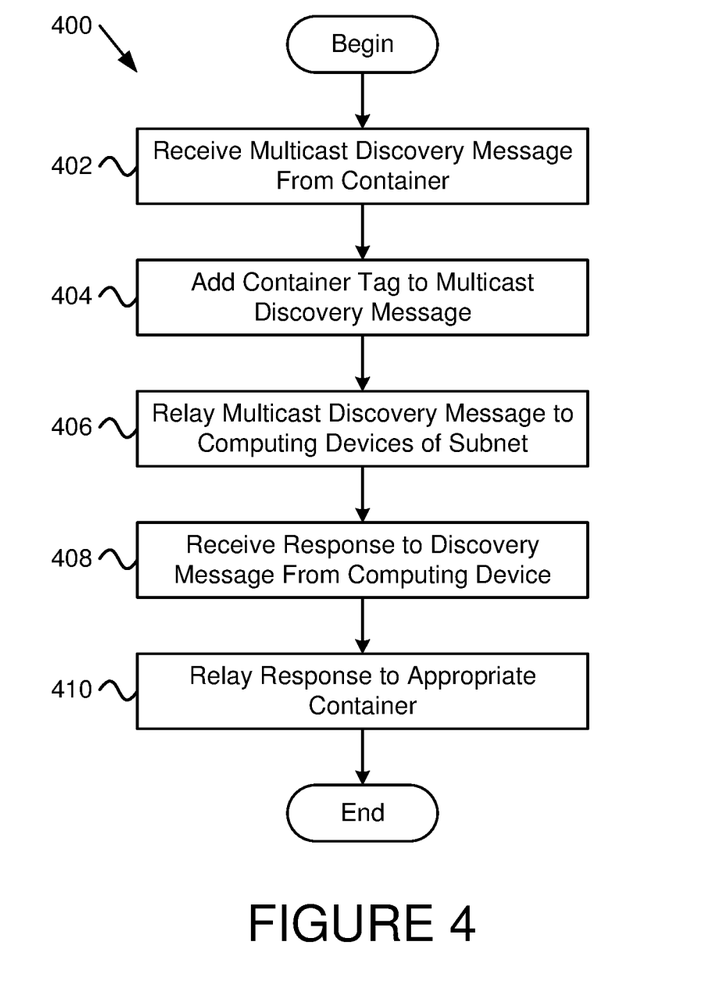
FIG. 4 is a schematic flow chart diagram illustrating a method for an intelligent multicast proxy between containers and an outside network, according to various embodiments.

FIG. 4 is a schematic flow chart diagram illustrating a method 400 for an intelligent multicast proxy 110 between containers 106 and an outside network, according to various embodiments. The method 400 begins and receives 402, at a proxy 110, a multicast discovery message from a container (e.g., 106a) of one or more containers 106 running on a host OS 104 of a server 104. The proxy 110 is running on the host OS 104 and the server 104 is connected to computing devices 120 over a subnet network 122. The method 400 adds 404 a container tag to a user defined field of the multicast discovery message and relays 406 the multicast discovery message with the container tag to the computing devices 120 connected to the subnet network 122.

The method 400 receives 408 a response to the multicast discovery message where the response includes the container tag. The method 400 relays 410 the response to the container 106a based on the container tag, and the method 400 ends. In various embodiments, all or a portion of the method 400 is implemented using the discovery receiver module 202, the tag module 204, the discovery relay module 206, the reply receiver module 208, and/or the reply relay module 210.

Figure 5:
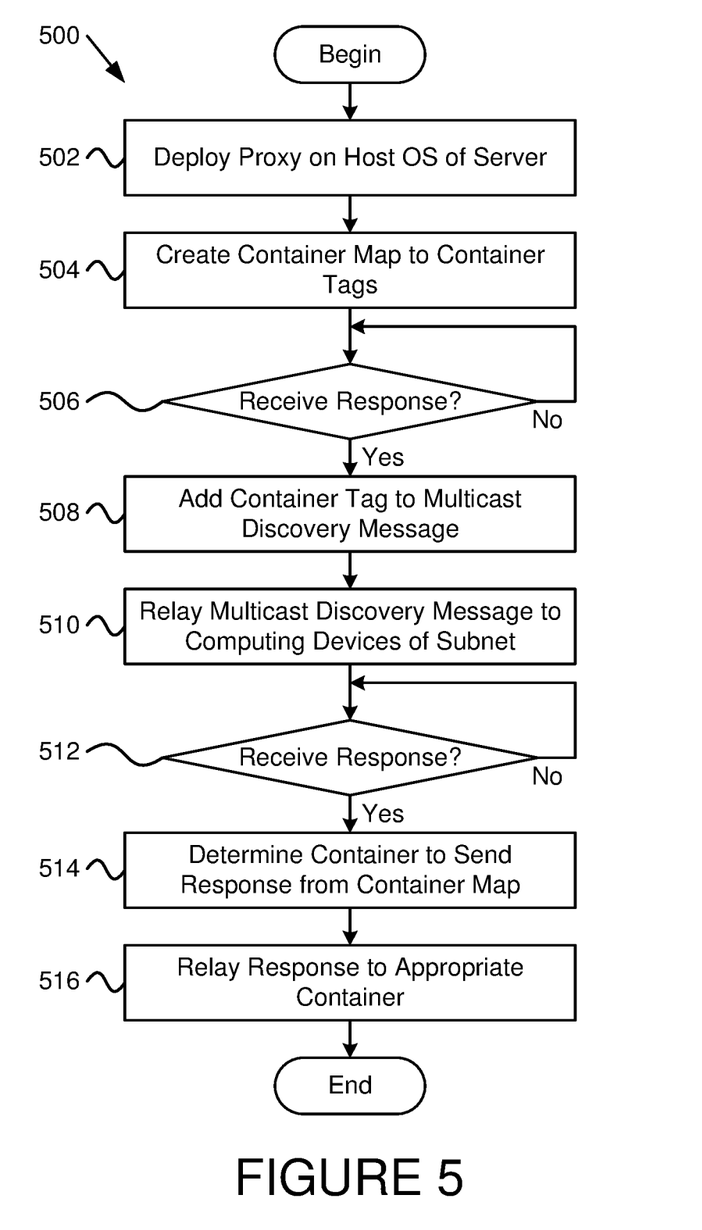
FIG. 5 is a schematic flow chart diagram illustrating another method for an intelligent multicast proxy between containers and an outside network, according to various embodiments.

FIG. 5 is a schematic flow chart diagram illustrating another method 500 for an intelligent multicast proxy 110 between containers 106 and an outside network, according to various embodiments. The method 500 begins and deploys 502 a proxy 110 on the host OS 104. The proxy 110 is connected to the one or more containers 106. In some embodiments, the method 500 also deploys a socket 112 on the proxy 110 and the containers 106 mount the socket to enable communication between the containers 106 and the socket 112. The method 500 creates 504 a container map 118 that includes, for each of the containers 106, a correlation between an identifier of the container 106 and a container tag.

The method 500 determines 506 if the proxy 110 has received a multicast discovery message from a container (e.g., 106a). If the method 500 determines 506 that the proxy 110 has not received a multicast discovery message from a container 106, the method 500 continues to determine 506 if the proxy 110 has received a multicast discovery message. If the method 500 determines 506 that the proxy 110 has received a multicast discovery message, the method 500 adds 508 a container tag to a user defined field of the multicast discovery message and relays 510 the multicast discovery message with the container tag to two or more of the computing devices 120 connected to the subnet network 122.

The method 500 determines 512 if the proxy 110 has received a response to the multicast discovery message. If the method 500 determines 512 that the proxy 110 has not received a response to the multicast discovery message, the method 500 continues to determine 512 if the proxy 110 has received a response. If the method 500 determines 512 that the proxy 110 has received a response to the multicast discovery message, where the response includes a container tag, the method 500 determines 514 the container that corresponds to the container tag from the container map 118 and relays 516 the response to the appropriate container (e.g., 106a), and the method 500 ends. In various embodiments, all or a portion of the method 500 is implemented using the discovery receiver module 202, the tag module 204, the discovery relay module 206, the reply receiver module 208, the reply relay module 210, the proxy module 302, and/or the container mapping module 304.

Figure 6:
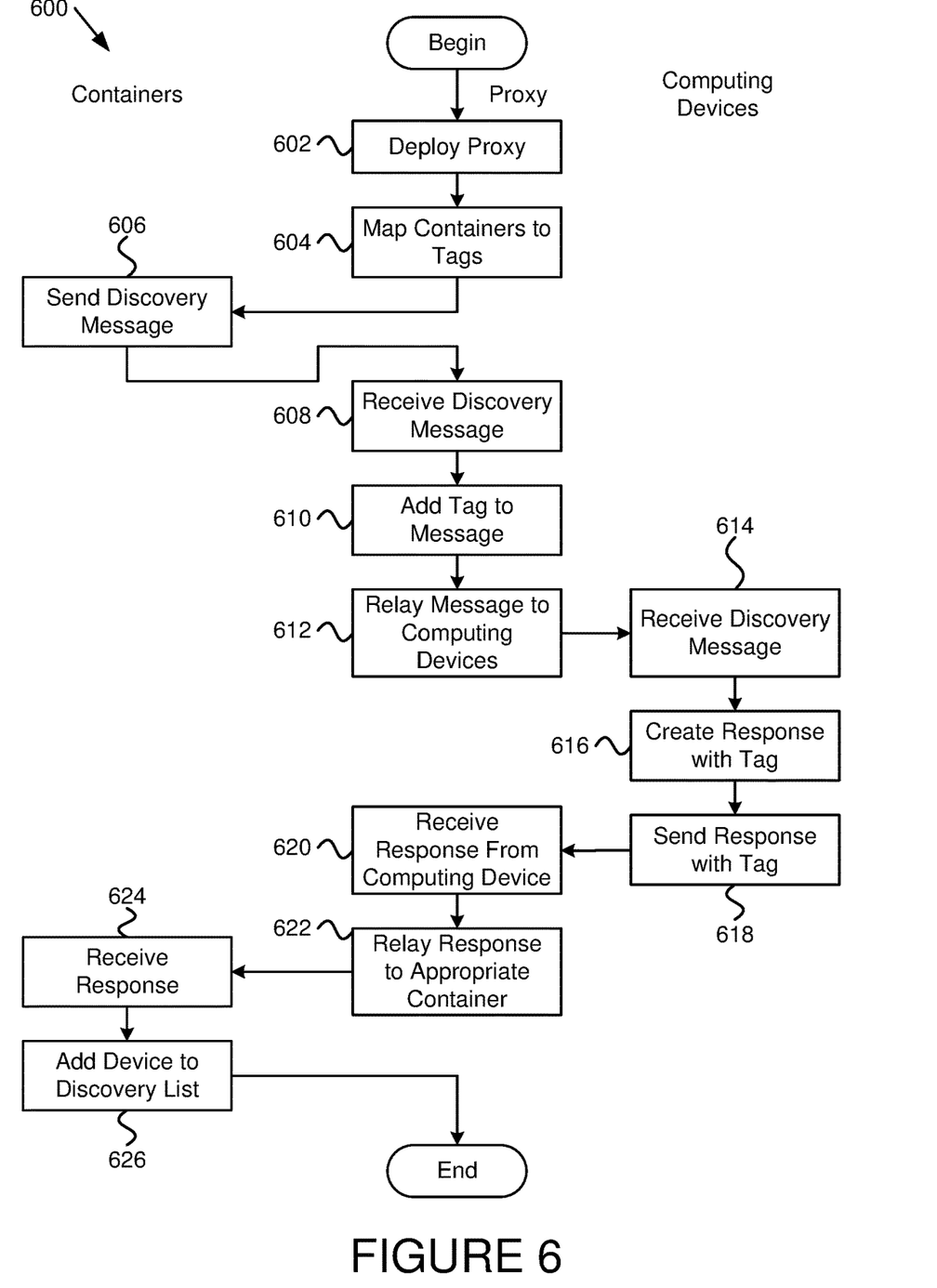
FIG. 6 is a schematic flow chart diagram illustrating a method for an intelligent multicast proxy between containers and an outside network illustrating actions at containers, the proxy and computing devices, according to various embodiments.

FIG. 6 is a schematic flow chart diagram illustrating a method 600 for an intelligent multicast proxy 110 between containers 106 and an outside network illustrating actions at containers 106, the proxy 110, and computing devices 120, according to various embodiments. The method 600 is applicable to a host OS/server 104 with containers 106 where the server 104 is connected to computing devices 120 over a subnet network 122. The method 600 begins and a container multicast apparatus 102 deploys 602 a proxy 110 on the host OS 104. The proxy 110 is connected to the one or more containers 106. In some embodiments, the container multicast apparatus 102 also deploys a socket 112 on the proxy 110 and the containers 106 mount the socket to enable communication between the containers 106 and the socket 112. The method 600 creates 604 a container map 118 that includes, for each of the containers 106, a correlation between an identifier of the container 106 and a container tag. In some embodiments, the container multicast apparatus 102 configures the containers 106 to send multicast discovery messages to the proxy 110.

At some point, a container (e.g., 106a) sends 606 a multicast discovery message to the proxy 110. The proxy 110 receives 608 the multicast discovery message and adds 610 a container tag to the multicast discovery message based on the container map 118. The proxy 110 relays 612 the multicast discovery message with the container tag to two or more computing devices 120 of the subnet network 122.

A computing device (e.g., 120a) receives 614 the multicast discovery message and creates 616 a response that includes the container tag from the multicast discovery message. Typically, the response includes information about the computing device 120a, such as a Media Access Control ("MAC") address, a Unique User Identifier ("UUID"), information about functionality of the computing device 120a, and other relevant information about the computing device 120a for discovery purposes. The computing device 120a sends 618 the response to the server 104.

The proxy 110 receives 620 the response with the container tag and relays 622 the response to the appropriate container 106a after determining which container 106a should receive the response from the container map 118. The container 106a receives 624 the response from the proxy 110 and adds 626 the computing device 120a sending the response to a discovery list of computing devices 120 that responded to the multicast discovery message, and the method 600 ends. In various embodiments, all or a portion of the method 600 is implemented using the discovery receiver module 202, the tag module 204, the discovery relay module 206, the reply receiver module 208, the reply relay module 210, the proxy module 302, and/or the container mapping module 304.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, at a proxy, a multicast discovery message from a container of one or more containers running on a host operating system ("OS") of a server, the proxy running on the host OS, the server connected to computing devices over a subnet network;
adding a container tag to a user defined field of the multicast discovery message;
relaying the multicast discovery message with the container tag to two or more of the computing devices connected to the subnet network;
receiving a response to the multicast discovery message, the response comprising the container tag; and
relaying the response to the container based on the container tag.

2. The method of claim 1, further comprising deploying the proxy on the host OS, the proxy connected to the one or more containers.

3. The method of claim 2, wherein deploying the proxy comprises deploying a socket in the proxy, wherein the one or more containers mount the socket for communications with each other and for communicating the multicast discovery message.

4. The method of claim 3, wherein the socket is a UNIX Domain Socket.

5. The method of claim 3, wherein each of the one or more containers mount a socket file associated with the socket, wherein a container of the one or more containers mounting the socket file enables communication between the container and the proxy.

6. The method of claim 1, wherein the proxy relaying the multicast discovery message comprises relaying the multicast discovery message to a plurality of the computing devices connected to the subnet network.

7. The method of claim 1, wherein the one or more containers execute within a container software platform running on the host OS.

8. The method of claim 1, wherein a protocol of the multicast discovery message is one of Simple Service Discovery Protocol ("SSDP") and Service Location Protocol ("SLP").

9. The method of claim 1, further comprising creating a container map comprising, for each of the one or more containers, a correlation between an identifier of the container and a container tag.

10. The method of claim 1, wherein the one or more containers comprise two or more containers and further comprising relaying, at the proxy, a message from a first container of the two or more containers to a second container of the two or more containers, the message comprising an identifier of second container.

11. The method of claim 1, wherein the proxy comprises an internet protocol ("IP") address of the subnet network and the proxy enables network access to the computing devices connected to the subnet network.

12. An apparatus comprising:
one or more processors; and
non-transitory computer readable storage media storing code, the code being executable by the one or more processors to perform operations comprising:
receiving, at a proxy, a multicast discovery message from a container of one or more containers running on a host operating system ("OS") of a server, the proxy running on the host OS, the server connected to computing devices over a subnet network;
adding a container tag to a user defined field of the multicast discovery message;
relaying the multicast discovery message with the container tag to two or more of the computing devices connected to the subnet network;
receiving a response to the multicast discovery message, the response comprising the container tag; and
relaying the response to the container based on the container tag.

13. The apparatus of claim 12, the operations further comprising deploying the proxy on the host OS, the proxy connected to the one or more containers.

14. The apparatus of claim 13, wherein deploying the proxy comprises deploying a socket in the proxy, wherein the one or more containers mount the socket for communications with each other and for communicating the multicast discovery message.

15. The apparatus of claim 14, wherein each of the one or more containers mount a socket file associated with the socket, wherein a container of the one or more containers mounting the socket file enables communication between the container and the proxy.

16. The apparatus of claim 12, wherein the proxy relaying the multicast discovery message comprises relaying the multicast discovery message to a plurality of the computing devices connected to the subnet network.

17. The apparatus of claim 12, wherein the one or more containers execute within a container software platform running on the host OS.

18. The apparatus of claim 12, the operations further comprising creating a container map comprising, for each of the one or more containers, a correlation between an identifier of the container and a container tag.

19. A program product comprising a non-transitory computer readable storage medium storing code, the code being configured to be executable by a processor to perform operations comprising:
receiving, at a proxy, a multicast discovery message from a container of one or more containers running on a host operating system ("OS") of a server, the proxy running on the host OS, the server connected to computing devices over a subnet network;
adding a container tag to a user defined field of the multicast discovery message;
relaying the multicast discovery message with the container tag to two or more of the computing devices connected to the subnet network;
receiving a response to the multicast discovery message, the response comprising the container tag; and
relaying the response to the container based on the container tag.

20. The program product of claim 19, the operations further comprising deploying the proxy on the host OS, the proxy connected to the one or more containers, wherein deploying the proxy comprises deploying a socket in the proxy, wherein the one or more containers mount the socket for communications with each other and for communicating the multicast discovery message.

* * * * *